United States Patent
Nagata et al.

(10) Patent No.: US 11,998,973 B2
(45) Date of Patent: Jun. 4, 2024

(54) METHOD FOR MANUFACTURING GEAR

(71) Applicant: AISIN CORPORATION, Aichi (JP)

(72) Inventors: Eiri Nagata, Kariya (JP); Tomokazu Tachikawa, Kariya (JP); Teruki Shibayama, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/093,971

(22) Filed: Jan. 6, 2023

(65) Prior Publication Data

US 2023/0294160 A1   Sep. 21, 2023

(30) Foreign Application Priority Data

Mar. 17, 2022 (JP) .................................. 2022-042480
Oct. 4, 2022 (JP) .................................. 2022-160203

(51) Int. Cl.
  *B21H 5/02* (2006.01)
(52) U.S. Cl.
  CPC ...................... *B21H 5/02* (2013.01)
(58) Field of Classification Search
  CPC ........................................................ B21H 5/02
  See application file for complete search history.

(56) References Cited

U.S. PATENT DOCUMENTS

2011/0302783 A1   12/2011   Nagata et al.

FOREIGN PATENT DOCUMENTS

DE         2040281 A1 *   8/1971
JP         2012-000628 A    1/2012

OTHER PUBLICATIONS

DE2040281 English translation (Year: 1971).*

* cited by examiner

*Primary Examiner* — Jason L Vaughan
*Assistant Examiner* — Amanda Kreiling
(74) *Attorney, Agent, or Firm* — Sughrue Mion, PLLC (57) ABSTRACT

A method for manufacturing a gear includes rotating a workpiece around a first axis, and rotating a plurality of cutting blades arranged annularly around a second axis skew to the first axis around the second axis. The method further includes, while causing the workpiece and the cutting blades to perform relative movement in a direction parallel to the first axis at a speed synchronized with a rotational speed of the workpiece, forming a helical tooth groove in an outer peripheral surface of the workpiece by the cutting blades. In a cross section perpendicular to the first axis, a diameter of a rolling circle in which an outline of the cutting blades and a target online of the gear make rolling contact with each other is larger than a diameter of a tooth depth center circle.

10 Claims, 7 Drawing Sheets

METHOD FOR MANUFACTURING GEAR

CROSS REFERENCE TO RELATED APPLICATIONS

This application is based on and claims priority under 35 U.S.C. § 119 to Japanese Patent Application No. 2022-042480, filed on Mar. 17, 2022 and Japanese Patent Application No. 2022-160203, filed on Oct. 4, 2022, the entire contents of which are incorporated herein by reference.

TECHNICAL FIELD

This disclosure generally relates to a method for manufacturing a gear.

BACKGROUND DISCUSSION

Conventionally, as a method for manufacturing a gear, a method by form rolling is known. For example, JP2012-000628A (Reference 1) discloses, as a method for manufacturing a gear by form rolling, a method in which a die having a predetermined tooth profile formed thereon is pressed against a cylindrical workpiece in such a way as to form teeth, thereby manufacturing a gear.

However, in the method described in Reference 1, the die is repeatedly pressed against the workpiece, and tooth grooves are thereby deepened gradually, and thus, it takes time to manufacture the gear.

A need thus exists for a gear manufacturing method which is not susceptible to the drawback mentioned above.

SUMMARY

A gear manufacturing method according to this disclosure includes rotating a workpiece around a first axis. The method further includes rotating a tool around a second axis that is at a position skew to the first axis. The tool is an annular tool whose center is the second axis, or a tool including a plurality of cutting blades arranged annularly around the second axis. The method further includes, while causing the workpiece and the tool to perform relative movement to each other in a direction parallel to the first axis at a speed synchronized with a rotational speed of the workpiece, making an inner peripheral side of the tool contact with an outer peripheral surface of the workpiece, and removing a material of the workpiece at a contacted portion by the relative movement between the tool and the workpiece, thereby forming a helical tooth in the outer peripheral surface of the workpiece. The method further includes rotating the workpiece around the first axis, and causing the workpiece and the tool to perform the relative movement in the direction parallel to the first axis at the speed synchronized with the rotational speed of the workpiece, in such a way that, in a cross section perpendicular to the first axis, an outline of the tool contacts with a target outline being an outline of the helical tooth to be formed, and meanwhile, at a predetermined one point on the target outline, makes rolling contact with the target outline without sliding relative to the target outline, and in an area other than the predetermined one point, rotates relative to the target outline while sliding relative to the target outline. In the cross section perpendicular to the first axis, a diameter of a first circle being a circle having the first axis as the center and passing through the predetermined one point is larger than a diameter of a second circle being a circle having the first axis as the center and passing through a tooth depth center in the target outline. A setting is made in such a way that, when the second axis is projected onto a plane including the first axis and being parallel to the second axis, the first axis and the projected second axis are axes different from each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1A:
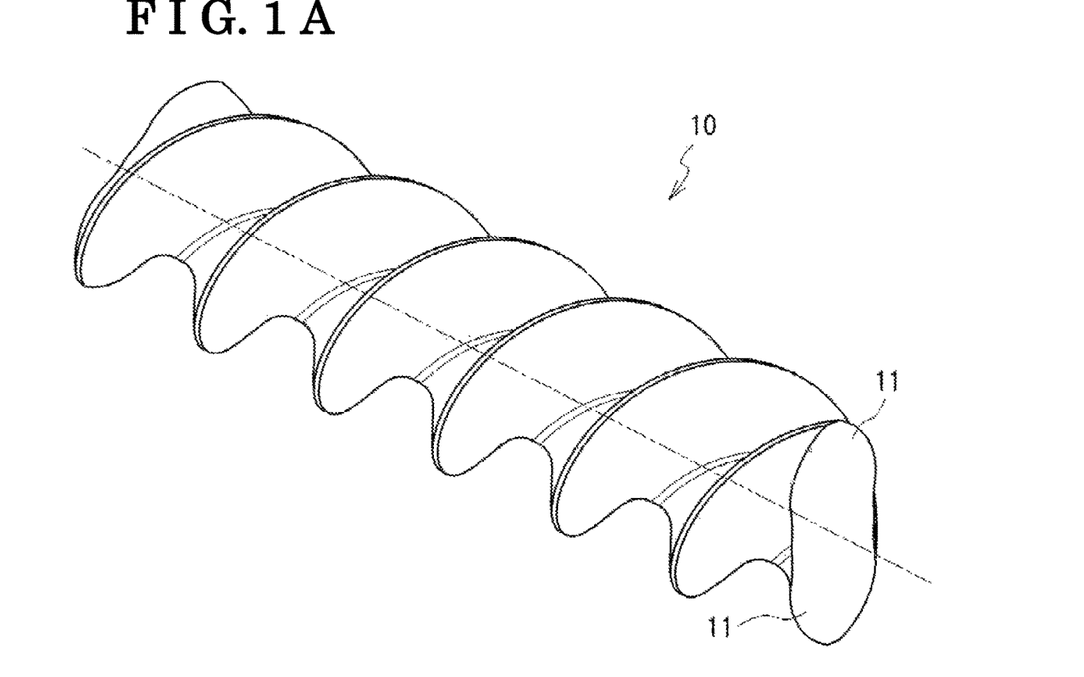
FIG. 1A is a perspective view illustrating an example of a gear to be manufactured.
Figure 1B:
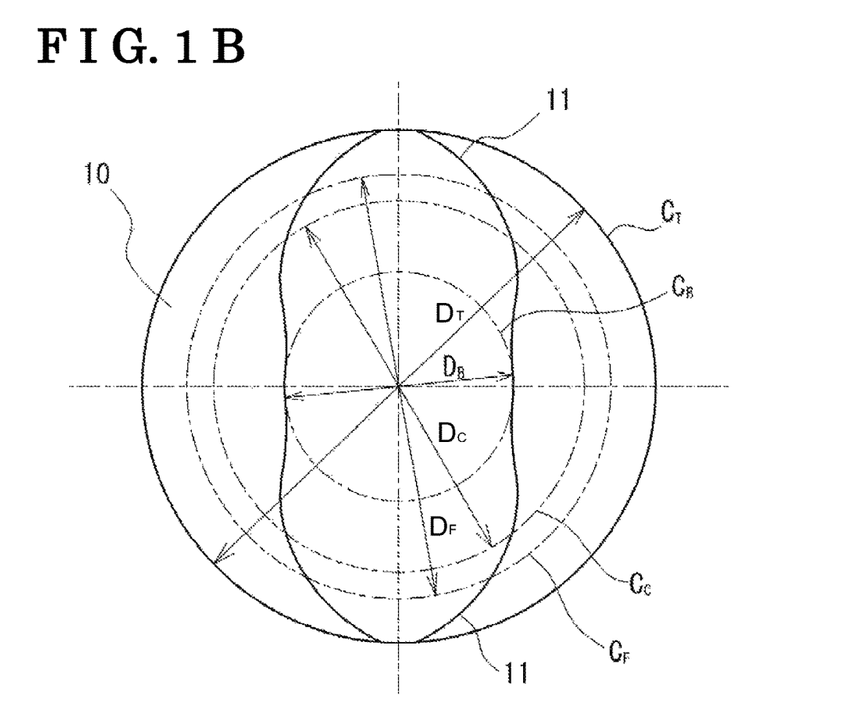
FIG. 1B is a cross-sectional view illustrating the example of the gear to be manufactured.

The following describes an embodiment of this disclosure in detail with reference to the drawings. This embodiment represents a method for manufacturing a gear 10 by using, as a starting material (workpiece W), a solid cylindrical member or a hollow cylindrical member that is made of metal. The gear 10 manufactured by the gear manufacturing method according to this embodiment is a helical gear that includes teeth 11 of which number (hereinafter, referred to as the number of the teeth) is any of 1 to 6 and that has a helix angle equal to or larger than 30 degrees and equal to or smaller than 60 degrees. FIG. 1A and FIG. 1B are diagrams illustrating one example of the gear 10 manufactured by the gear manufacturing method according to this embodiment. FIG. 1A is a perspective view of the gear 10, and FIG. 1B is an illustration of a cross section of the gear 10 cut by a plane perpendicular to an axial direction thereof. FIG. 1A and FIG. 1B illustrate the helical gear including two teeth and having a helix angle of 45 degrees.

In this embodiment, "tooth depth center circle $C_C$" denotes a circle $C_C$ passing through a center of a tooth depth of the gear 10. This tooth depth center circle $C_C$ is an example of a second circle of this disclosure. A diameter $D_C$ of the tooth depth center circle $C_C$ is expressed by the following:

The diameter $D_C$ of the tooth depth center circle $C_C$={(a diameter $D_B$ of a dedendum circle $C_B$)+(a diameter $D_T$ of an addendum circle $C_T$)}/2.

The tooth depth center circle $C_C$ actually corresponds to a cylinder extending in the axial direction of the gear 10.

Figure 2A:
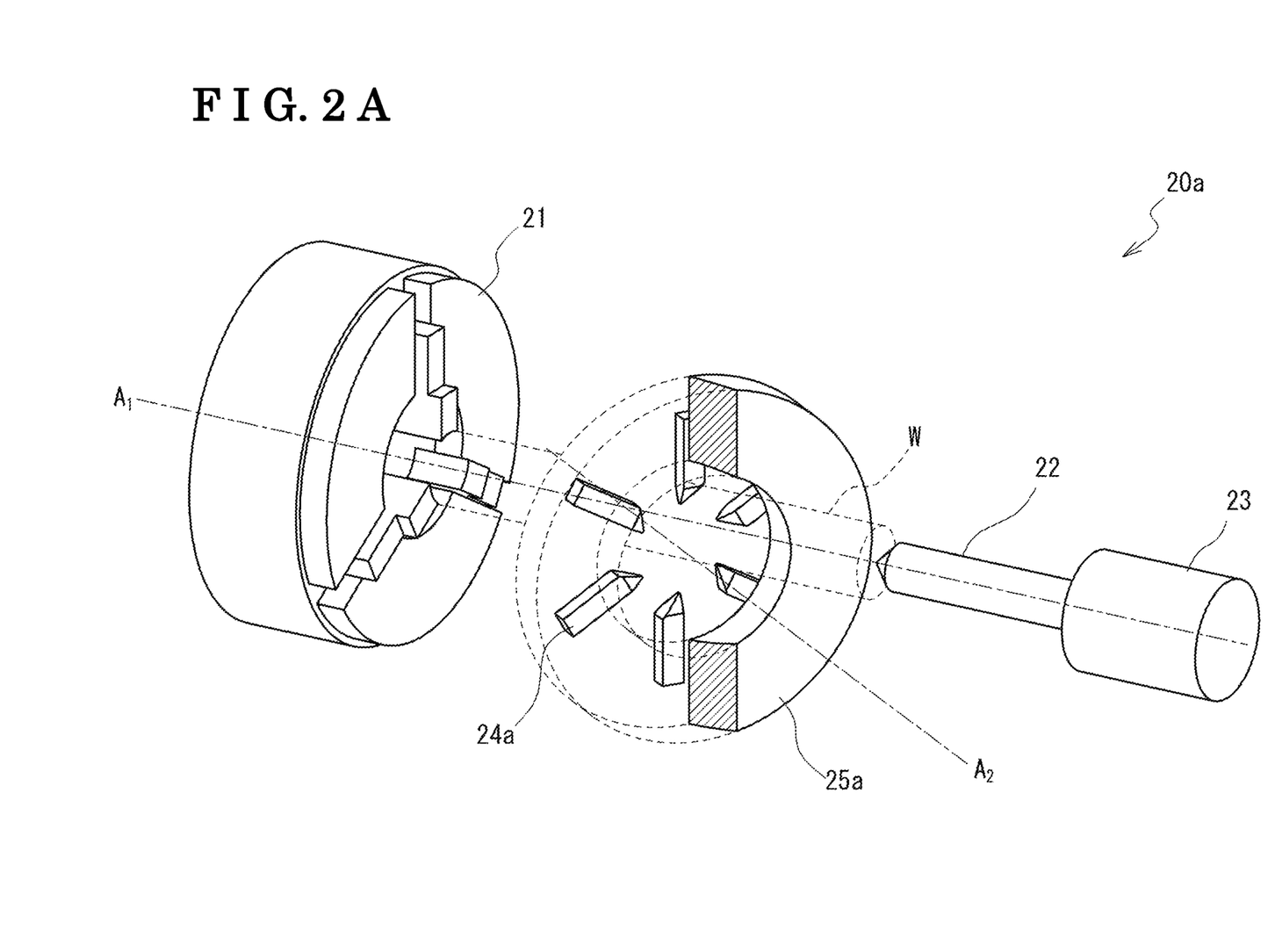
FIG. 2A is a perspective view illustrating a configuration example of a gear manufacturing device.
Figure 2B:
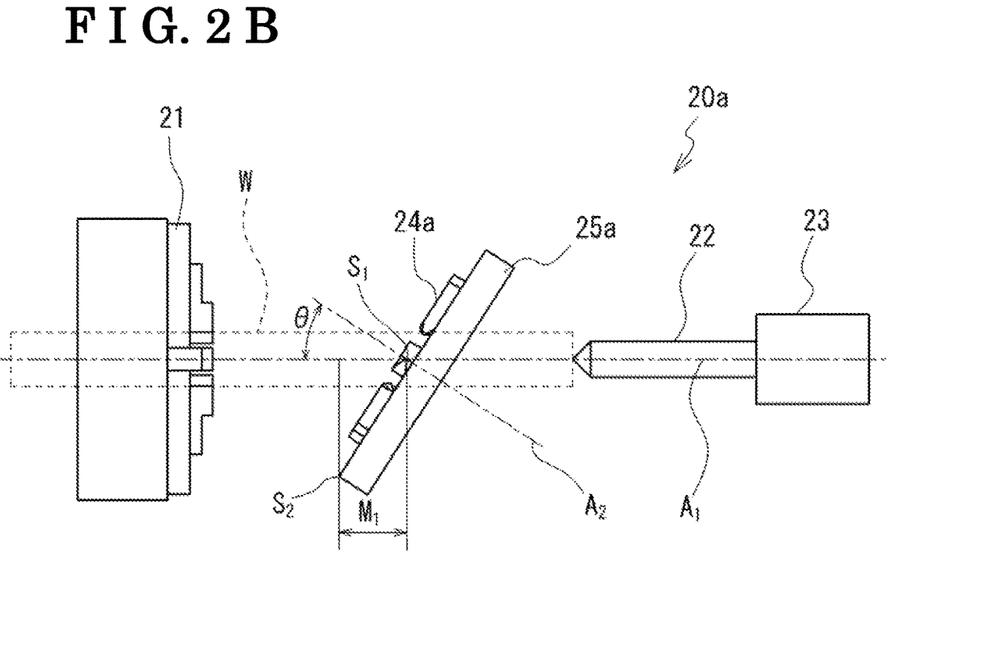
FIG. 2B is a plan view illustrating the configuration example of the gear manufacturing device.

FIG. 2A and FIG. 2B are schematic diagrams illustrating a configuration example of a main part of a first device 20a that can implement the gear manufacturing method according to this embodiment. FIG. 2A is a perspective view of the first device 20a, and FIG. 2B is a plan view of the first device 20a. A device capable of whirling machining can be applied to the first device 20a. As illustrated in FIG. 2A, the first device 20a includes a chuck 21, a center 22, a tailstock 23, a cutting blade 24a, and a tool holder 25a (whirling head). The chuck 21 is configured in such a way as to be capable of supporting (holding) an axial-direction one end portion of the workpiece W that is a solid cylindrical member or a hollow cylindrical member. The center 22 and the tailstock 23 are configured in such a way as to be capable of supporting (holding) an axial-direction opposite end portion of the workpiece W. The cutting blade 24a is configured in such a way as to be capable of cutting an outer peripheral surface of the workpiece W. The tool holder 25a is configured in such a way that a plurality of the cutting blades 24a can be attached to (supported by) the tool holder 25a. The cutting blades 24a and the tool holder 25a to which the cutting blades 24a have been attached constitute an example of "a tool that includes a plurality of annularly arranged cutting blades" of this disclosure. The first device 20a further includes an unillustrated rotational power source, and the chuck 21 and the tool holder 25a are each configured in such a way as to be rotatable by the rotational power source. A first axis $A_1$ denotes a rotation center line $A_1$ of the chuck 21 (i.e., a rotation center line (axis) of the workpiece W supported by the chuck 21), and a second axis $A_2$ denotes a rotation center line $A_2$ of the tool holder 25a (i.e., the rotation center line of "the tool that includes a plurality of the annularly arranged cutting blades"). The first axis $A_1$ and the second axis $A_2$ are at positions skew to each other. In other words, the first axis $A_1$ and the second axis $A_2$ are not parallel to each other and do not intersect with each other. Specifically, the first axis $A_1$ and the second axis $A_2$ are set in such a way that when the second axis $A_2$ is projected onto "a plane including the first axis $A_1$ and parallel to the second axis $A_2$" in a direction perpendicular to this plane, the first axis $A_1$ and the projected second axis $A_2$ are axes different from each other. The first axis $A_1$ and the projected second axis $A_2$ are inclined from each other at a predetermined angle $\theta$ (refer to FIG. 2B). This predetermined angle $\theta$ (however, the smaller angle in angles made by the first axis $A_1$ and the second axis $A_2$) is denoted by an axis inclination angle $\theta$. When the axis inclination angle $\theta$ is zero degree, the first axis $A_1$ and the second axis $A_2$ are parallel to each other.

The tool holder 25a has an annular shape whose center is the second axis $A_2$, and is configured in such a way that the workpiece W can be inserted through the tool holder 25a on an inner peripheral side thereof. A plurality of the cutting blades 24a are attached to the tool holder 25a in such a way as to be arranged annularly around the second axis $A_2$ (i.e., in a circumferential direction of a circle whose center is the second axis $A_2$). In the present embodiment, a plurality of the cutting blades 24a are arranged radially around the second axis $A_2$ at constant intervals in the circumferential direction.

The workpiece W is arranged in relation to the tool holder 25a in such a way as to be inserted through an inner peripheral side of the tool holder 25a. The cutting blade 24a is configured in such a way as to be capable of cutting the outer peripheral surface of the workpiece W inserted through the inner peripheral side of the tool holder 25a (be capable of removing a material of the workpiece W at a contacted portion) in a state where the cutting blade 24a is attached to the tool holder 25a. A shape of the cutting blade 24a is described below. Although the six cutting blades 24a are arranged in a configuration illustrated in FIG. 2A, the number of the cutting blades 24a is not limited.

The first device 20a is configured in such a way as to be capable of moving the workpiece W and the tool holder 25a relative to each other in a direction parallel to the first axis A at a speed synchronized with a rotational speed of the chuck 21 (i.e., a rotational speed of the workpiece W) in a state where the workpiece W is supported by the chuck 21 and the tailstock 23 (center 22). The first device 20a may be configured in such a way that the chuck 21, the center 22, and the tailstock 23 are movable linearly in the direction parallel to the first axis $A_1$, or may be configured in such a way that the tool holder 25a is movable linearly in the direction parallel to the first axis $A_1$, or may be configured in such a way that the chuck 21, the center 22, and the tailstock 23 as well as the tool holder 25a are movable linearly in the direction parallel to the first axis $A_1$. The first device 20a is configured in such a way that a rotational speed of the chuck 21 and a rotational speed of the tool holder 25a can be set in asynchronization with each other (i.e., independently of each other).

Figure 3:
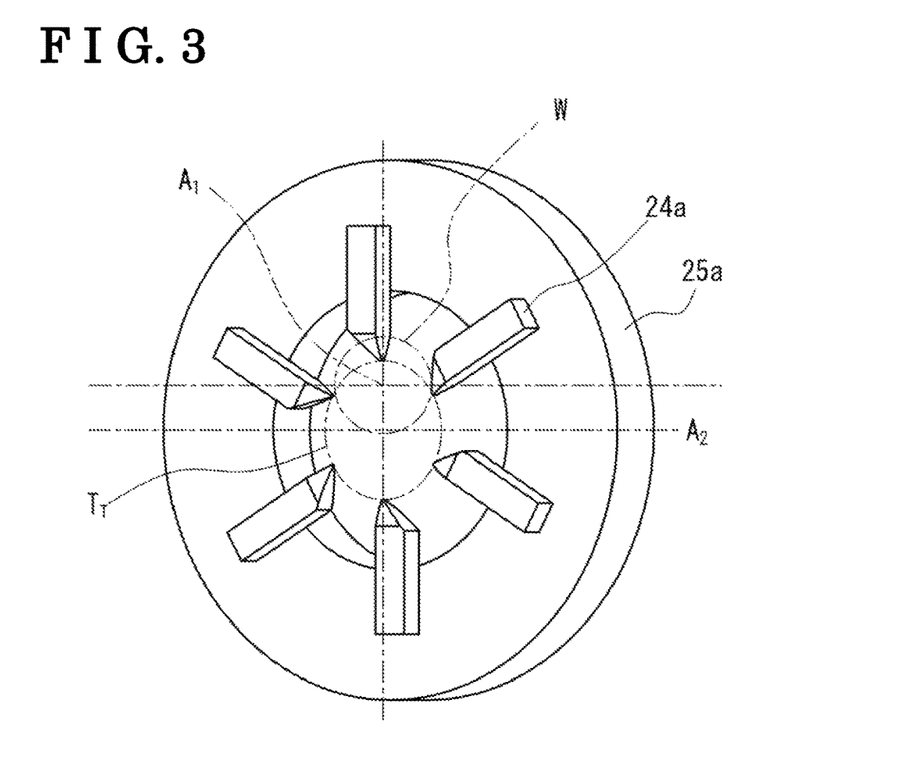
FIG. 3 is a diagram illustrating a positional relation between a workpiece and cutting blades.

FIG. 3 is a diagram illustrating a positional relation between the workpiece W and the cutting blades 24a, and illustrating the workpiece W and the cutting blades 24a viewed in a direction of the first axis $A_1$. The first axis $A_1$ and the second axis $A_2$ are inclined from each other at the predetermined axis inclination angle $\theta$, and thus, when the tool holder 25a rotates around the second axis $A_2$, a trajectory TT of a plurality of tips (i.e., portions closest to the second axis $A_2$) of the cutting blades 24a becomes an ellipse in a case of being viewed in the direction parallel to the first axis $A_1$. As illustrated in FIG. 3, this trajectory TT (i.e., the ellipse) is eccentric to the first axis $A_1$ in a direction of a major axis of the ellipse.

Herein, operation of the first device 20a at the time of manufacturing the gear 10 is described. The workpiece W is rotated around the first axis $A_1$ in a state where the workpiece W is supported by the chuck 21 and the tailstock 23. Further, the tool holder 25a is rotated around the second axis $A_2$ in a state where a plurality of the cutting blades 24a are attached to the tool holder 25a. A rotational speed of the workpiece W and a rotational speed of the tool holder 25a may be asynchronous with each other. The workpiece W and the tool holder 25a are moved relative to each other in a direction parallel to the first axis $A_1$ at a speed synchronized with the rotational speed of the workpiece W. A specific relative speed between the workpiece W and the tool holder 25a is a speed set in such a way that the workpiece W and the tool holder 25a move relative to each other by a distance of (the number of teeth of the gear 10 to be manufactured)× (an interval between mutually neighboring teeth 11 in the direction of the first axis $A_1$), each time the workpiece W makes one complete rotation.

The tip of each of the rotating cutting blades 24a is made to contact with the outer peripheral surface of the workpiece W, thereby removing a material of the workpiece W at a contacted portion. Since the first axis $A_1$ and the second axis $A_2$ are at positions skew to each other, a tooth groove is formed in the outer peripheral surface of the workpiece W in such a way as to extend in a direction inclined from the first axis $A_1$ at an angle depending on the axis inclination angle $\theta$. The workpiece W and the tool holder 25a are moved relative to each other in the direction parallel to the first axis $A_1$ at the speed synchronized with the rotational speed of the workpiece W, and thereby, the helical tooth groove is formed in the outer peripheral surface of the workpiece W. As a result, the helical tooth 11 is formed in the outer peripheral surface of the workpiece W. Thereby, the helical gear is manufactured.

Thus, in the method for manufacturing the gear 10 according to the present embodiment, the tooth groove (helical groove) is formed by intermittent machining with a plurality of the rotating cutting blades 24a. With such a configuration, heat generation at the time of the machining is reduced more than in continuous machining with a single cutting blade. Thus, the highly precise gear 10 can be manufactured. According to this embodiment, the gear 10 can be manufactured by one-time pass (meaning the one-time relative movement between the workpiece and the tool in the direction parallel to the first axis). Thus, time required for manufacturing the gear 10 can be shortened. Further, unlike the case of manufacturing a gear by form rolling, according to this embodiment, the material (workpiece) is not extruded, and thus, additional processing (specifically, processing of removing an extruded material) is unnecessary.

Figure 4:
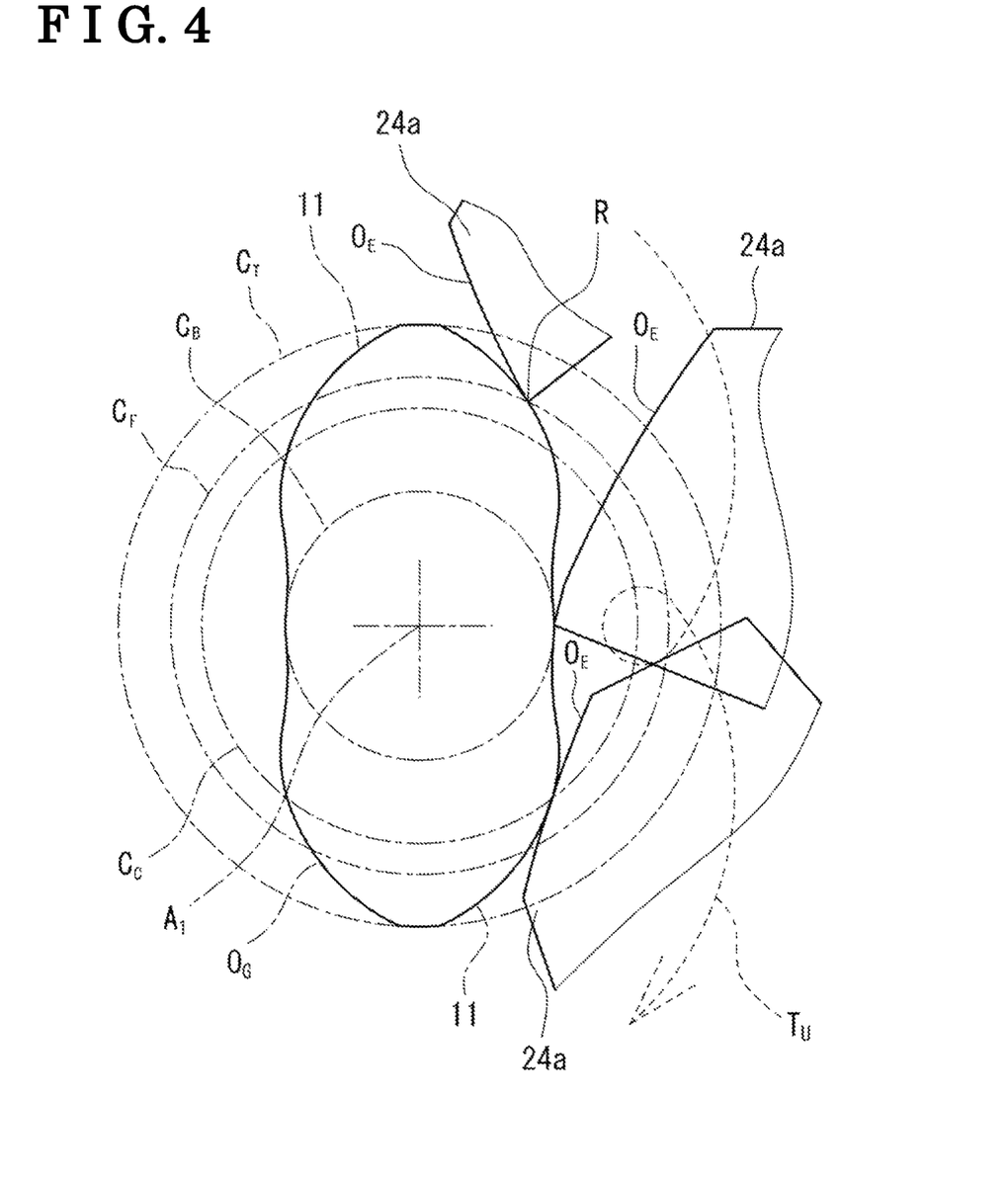
FIG. 4 is a diagram illustrating a movement trajectory of the cutting blade relative to the workpiece.

FIG. 4 is a diagram illustrating a movement trajectory $T_U$ (i.e., the movement trajectory $T_U$ of an outline $O_E$ of the cutting blade 24a, relative to the workpiece W) of the outline $O_E$ of the cutting blade 24a in a cross section perpendicular to the first axis $A_1$ when the workpiece W is fixed. When the workpiece W is fixed, the outline $O_E$ of the cutting blade 24a moves in this cross section while contacting with a target outline $O_G$ (meaning the design outline of the tooth 11 of the gear 10 to be manufactured) of the tooth 11 of the gear 10, and while rotating relative to the workpiece W around a straight line (the straight line perpendicular to the paper surface in FIG. 4) parallel to the first axis $A_1$. The movement trajectory $T_U$ of the cutting blade 24a in this cross section is a hypocycloidal curve.

There exists a point R at which the outline $O_E$ of the cutting blade 24a makes rolling contact with the target outline $O_G$ of the tooth 11 without sliding relative to the target outline $O_G$ when the outline $O_E$ of the cutting blade 24a moves in this cross section. Conversely, the outline $O_E$ of the cutting blade 24a contacts with the target outline $O_G$, and meanwhile, at the predetermined one point R on the target outline $O_G$, makes rolling contact with the target outline $O_G$ without sliding relative to the target outline $O_G$, and in an area other than the predetermined one point R, rotates relative to the target outline $O_G$ while sliding relative to the target outline $O_G$. Hereinafter, "rolling circle $C_F$" denotes a circle that is in a plane perpendicular to the first axis $A_1$, that has, as a center, the first axis $A_1$, and that passes through this rolling contact point R. This rolling circle $C_F$ is an example of a first circle in this disclosure.

In whirling machining, the axis inclination angle θ is determined based on a diameter $D_F$ of the rolling circle $C_F$. Accordingly, also in this embodiment, the axis inclination angle θ is determined based on the diameter $D_F$ of the rolling circle $C_F$. At this time, the axis inclination angle θ is determined depending on the number N of the helical teeth formed in the workpiece W, the interval P of the spiral teeth, formed in the workpiece W, in the direction parallel to the first axis, and a circumferential length $L_1$ of the first circle. Specifically, the axis inclination angle θ is determined by the following equation (1).

$$\theta = \tan^{-1}((N \times P)/L_1) \quad \text{Equation (1)}$$

N: the number of the tooth grooves formed in the workpiece W (=the number of the teeth of the gear 10 to be manufactured)

P: the interval of the tooth grooves, formed in the workpiece W, in the direction parallel to the first axis $A_1$ $L_1$: (the diameter $D_F$ of the rolling circle $C_F$)×(a circumference ratio π) (=the circumferential length of the rolling circle $C_F$)

Incidentally, relative movement of the tool holder 25a to the chuck 21, the center 22, and the tailstock 23 can be performed in the direction parallel to the first axis $A_1$ within a range in which mutual contact does not occur. As illustrated in FIG. 2B, the first axis $A_1$ and the second axis $A_2$ are set in such a way as to be axes different from each other, and are inclined from each other at the axis inclination angle θ. For this reason, even when the tool holder 25a is made to be closest to the chuck 21 within a range in which an outer peripheral portion S2 of the tool holder 25a does not contact with the chuck 21, a position $S_1$ (a center portion of the tool holder 25a) where the cutting blade 24a actually cuts the workpiece W) is located at a position separated from the chuck 21 by a distance $M_1$. In other words, in the workpiece W, the tooth groove cannot be formed in a range within the distance $M_1$ from the position $S_1$ contacted by the cutting blade 24a. The same applies to the center 22 and tailstock 23. As is apparent from FIG. 2B, increasing the axis inclination angle θ results in an increase in the distance $M_1$ as well. Accordingly, as the axis inclination angle θ is increased, a part where the tooth groove cannot be formed in the workpiece W becomes longer. Further, as the axis inclination angle θ is increased, a part where a shape of the tooth groove 11 is incomplete becomes longer. This part is a part (a part where the target outline $O_G$ of the tooth 11 cannot be achieved, i.e., a part where the tooth 11 does not come to have a designed shape) in an end portion of a range where the tooth groove is formed. Particularly, in a case of manufacturing the helical gear having a helix angle equal to or larger than 30 degrees and equal to or smaller than 60 degrees as in this embodiment, the axis inclination angle θ needs to be larger than in a case of manufacturing a general male screw for fastening, and thus, the above-described problem is likely to occur.

Figure 5:
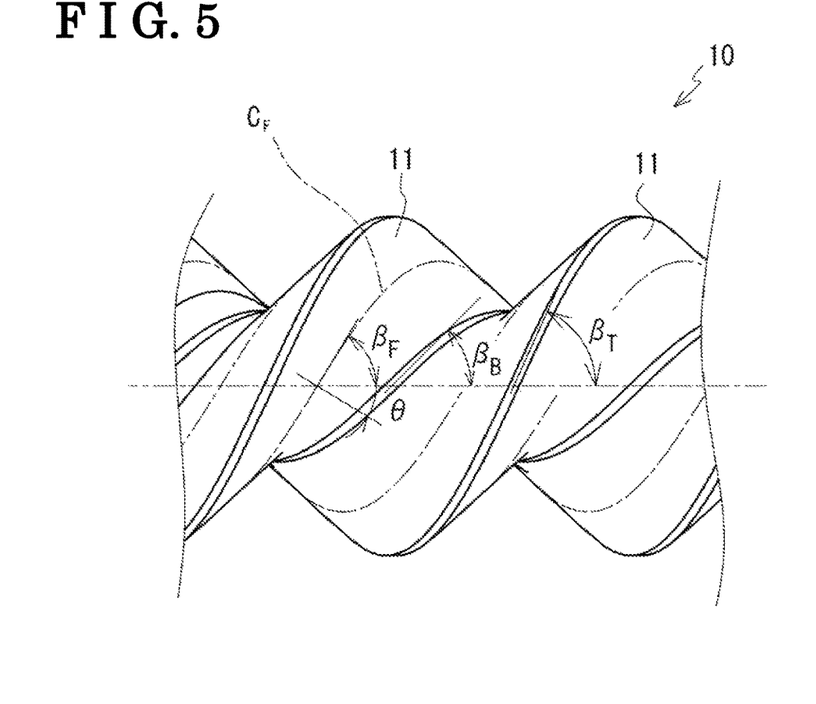
FIG. 5 is a side view illustrating the example of the gear to be manufactured.

In this embodiment, the diameter $D_F$ of the rolling circle $C_F$ is set larger than the diameter $D_C$ of the tooth depth center circle $C_C$ and equal to or smaller than the diameter $D_T$ of the addendum circle $C_T$. Thereby, the axis inclination angle θ can be smaller than that in a configuration in which the diameter $D_F$ of the rolling circle $C_F$ is set equal to or smaller than the diameter $D_C$ of the tooth depth center circle $C_C$. Specifically, as is apparent from FIG. 5, the helix angle of the gear 10 decreases toward an addendum from a dedendum. FIG. 5 is a side view of the gear 10. In FIG. 5, $\beta_B$ denotes the helix angle at the dedendum, and $\beta_T$ denotes the helix angle at the addendum, and $\beta_F$ denotes the helix angle at the rolling circle $C_F$. The helix angle $\beta_F$ at the rolling circle $C_F$ of the gear 10 (helical gear) manufactured by the above-described method is in the following relation:

the helix angle $\beta_F(°) = 90(°) - $ (the axis inclination angle θ(°)).

Accordingly, when the diameter $D_F$ of the rolling circle $C_F$ is increased, a value of the helix angle $\beta_F$ at the diameter $D_F$ of the rolling circle $C_F$ is increased, and thus, a value of the axis inclination angle θ can be decreased.

Decreasing the axis inclination angle θ can decrease the distance $M_1$. In other words, it is possible to reduce interference of the chuck 21 as a support portion supporting the workpiece W, the center 22, and the tailstock 23, with the cutting blades 24a and the tool holder 25a as a support portion supporting the cutting blades 24a, when the workpiece W and the cutting blades 24a are moved relative to each other in the direction parallel to the first axis $A_1$. Accordingly, a length of the part where the tooth groove cannot be formed in the workpiece W can be shortened. Further, decreasing the axis inclination angle θ can shorten the part (the part that does not have a target shape, i.e., the designed shape) where a shape of the tooth groove of the gear 10 to be formed is incomplete.

Particularly, a lead angle (=90°−(the helix angle (°) of the gear 10)) of the helical gear is larger than a lead angle of a general screw for fastening. For this reason, according to this embodiment, although the axis inclination angle θ needs to be larger than that in a case of manufacturing a screw for fastening, the axis inclination angle θ can be made smaller in a case of manufacturing the helical gear.

As the number of the teeth is made smaller, a ratio of a dimension from the tooth depth center to the addendum to a diameter of a base circle or the dedendum circle in the gear 10 becomes larger. As this ratio is made larger, a ratio of a decrease in the axis inclination angle θ to an increase (i.e., an increase in the diameter $D_F$ of the rolling circle $C_F$) in a dimension difference between the diameter $D_F$ of the rolling circle $C_F$ and the diameter $D_C$ of the tooth depth center circle $C_C$ becomes larger. For this reason, as the number of the teeth is made smaller, for example, when the number of the teeth is any of 1 to 6 as in this embodiment, an effect of decreasing the axis inclination angle θ is more enhanced.

Figure 6:
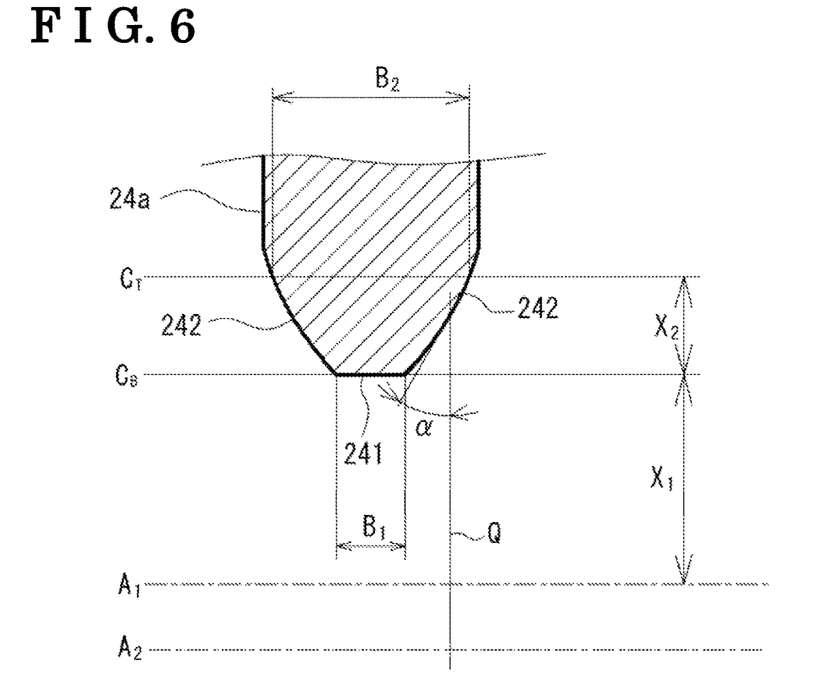
FIG. 6 is a sectional view illustrating a shape of the cutting blade.

In this embodiment, the diameter $D_F$ of the rolling circle $C_F$ is made larger than the diameter $D_C$ of the tooth depth center circle $C_C$ by setting a shape of the cutting blade 24a so as to be the below-described shape. FIG. 6 is an illustration of a section of the cutting blade 24a cut by a plane including the second axis $A_2$, in a state where the cutting blade 24a is attached to the tool holder 25a. In FIG. 6, the first axis $A_1$, the dedendum circle $C_B$, and the addendum circle $C_T$ are inclined from the paper surface. As illustrated in FIG. 6, a shape of the section of the cutting blade 24a cut by the plane including the second axis $A_2$ has a tapered shape whose width (a dimension in a direction parallel to the second axis $A_2$) becomes smaller as a position approaches the second axis $A_2$. In other words, a part (the part closer to the first axis $A_1$ and the second axis $A_2$ than the addendum circle $C_T$ in FIG. 6) that enters an inside of the addendum circle $C_T$ at the time of machining has a substantially trapezoidal shape that includes, as an upper base, an edge closer to the second axis $A_2$, includes, as a lower base, an edge farther from the second axis $A_2$, and includes oblique edges on both sides in the axial direction of the second axis $A_2$. However, the edges (the edges corresponding to oblique edges of the trapezoid) on both sides in the axial direction of the second axis $A_2$ are curved lines (curved surfaces) each of which is formed in such a way as to swell outward in the axial direction of the second axis $A_2$. A surface corresponding to the upper base of the trapezoid is denoted by a tip surface 241, and surfaces corresponding to the oblique edges of the trapezoid are denoted by side surfaces 242.

In this plane, a tool pressure angle α is an angle made by a straight line Q perpendicular to the second axis $A_2$ and a tangent line to the side surface 242 at an intersection point between the straight line Q and the side surface 242. In this embodiment, the tool pressure angle α of the cutting blade 24a in a case of manufacturing a predetermined helical gear is a value larger than a tool pressure angle of a cutting blade in a case of manufacturing the same helical gear (the helical gear having the same shape and dimensions) as the predetermined helical gear by the same device when the diameter $D_F$ of the rolling circle $C_F$ is the same as the diameter $D_C$ of the tooth depth center circle $C_C$. In this embodiment, the side surface 242 of the cutting blade 24a is the curved surface formed in such a way as to swell outward, and thus, the tool pressure angle α gradually (smoothly) increases as a position approaches the second axis $A_2$. For this reason, more strictly, "the tool pressure angle α at a position separated by a predetermined distance from the tip surface 241 of the cutting blade 24a in a height direction (the direction perpendicular to the second axis $A_2$) in a case of manufacturing the predetermined helical gear" in this embodiment is "a value larger than a tool pressure angle at the same position as the position separated by the predetermined distance from the tip surface of the cutting blade in the height direction in a case of manufacturing the same helical gear (the helical gear having the same shape and dimensions) as the predetermined helical gear by the same device when the diameter $D_F$ of the rolling circle $C_F$ is the same as the diameter $D_C$ of the tooth depth center circle $C_C$". A specific value of the tool pressure angle α is determined depending on a shape, dimensions, and the like of the tooth 11 of the gear 10 to be manufactured, and is not limited.

An upper limit of the tool pressure angle α is not particularly limited, but is actually restricted by the axis inclination angle θ and a shape and dimensions of the tooth 11 of the gear 10 to be manufactured. Specifically, as is apparent from FIG. 6, when the cutting blade 24a most approaches the first axis $A_1$, a distance $X_1$ from the first axis $A_1$ to the tip of the cutting blade 24a needs to be half of the diameter $D_B$ of the dedendum circle $C_B$. A dimension $X_2$ (the height of the trapezoid) of the side surface 242 of the cutting blade 24a in a radial direction of a circle whose center is the second axis $A_2$ needs to be equal to or larger than the tooth depth of the gear 10 to be manufactured. Meanwhile, as the tool pressure angle α is made larger, the width Bi of the tip surface 241 of the cutting blade 24a becomes smaller, and when the width Bi becomes zero, the sectional shape of the cutting blade 24a becomes substantially triangular instead of being substantially trapezoidal. As the tool pressure angle α is further made larger, the dimension $X_2$ of the side surface 242 of the cutting blade 24a becomes smaller. For this reason, when the sectional shape of the cutting blade 24a becomes substantially triangular, the dimension $X_2$ of the cutting blade 24a for manufacturing the gear 10 cannot be secured. Thus, it can be said that the maximum value of the tool pressure angle α is "the maximum value in a range in which the dimension $X_2$ of the cutting blade 24a (the dimension in the direction perpendicular to the second axis $A_2$) does not change" or "the maximum value in a range in which the sectional shape of the cutting blade 24a can be kept substantially trapezoidal without changing the dimension $X_2$".

According to such a configuration, the rolling circle $C_F$ can be located outside the tooth depth center circle $C_C$. Accordingly, the axis inclination angle θ is made smaller than that in a case where the diameter $D_F$ of the rolling circle $C_F$ is equal to or smaller than a diameter of the tooth depth center circle $C_C$. For this reason, the distance $M_1$ illustrated in FIG. 2B can be made smaller. Thus, the range in which tooth groove cannot be formed in the workpiece W can be shortened. Further, making the axis inclination angle θ smaller can shorten the part where a shape of the tooth 11 is incomplete (the part where the target outline $O_G$ of the tooth 11 cannot be achieved) in the end portion of the range where the tooth groove is formed. Furthermore, it is possible to increase the range in which relative movement of the tool holder 25a to the chuck 21, the center 22, and the tailstock 23 can be performed. Thus, an axial-direction dimension of the gear 10 to be manufactured can be increased.

According to such a configuration, merely increasing the tool pressure angle α can decrease the axis inclination angle θ.

In the gear manufacturing method according to this embodiment, a rotational speed of the tool holder 25a is not restricted by a rotational speed of the workpiece W. In other words, a rotational speed of the tool holder 25a and a rotational speed of the workpiece W can be made asynchronous with each other. For this reason, a rotational speed of the tool holder 25a, i.e., a cutting speed can be increased regardless of a rotational speed of the workpiece W. Since a cutting speed can be increased, the gear 10 can be manufactured by one-time relative movement between the workpiece W and the tool holder 25a. Increasing a cutting speed can increase a speed of the relative movement between the workpiece W and the tool holder 25a. Thus, time required for manufacturing the gear 10 can be shortened. Further, increasing a cutting speed can make a cut surface smooth (can make roughness of a machined surface smaller).

According to this embodiment, a device capable of implementing a conventionally known whirling machining (thread whirling) can be applied to the first device 20a. Thus, according to this embodiment, an increase in equipment cost can be prevented.

Figure 7:
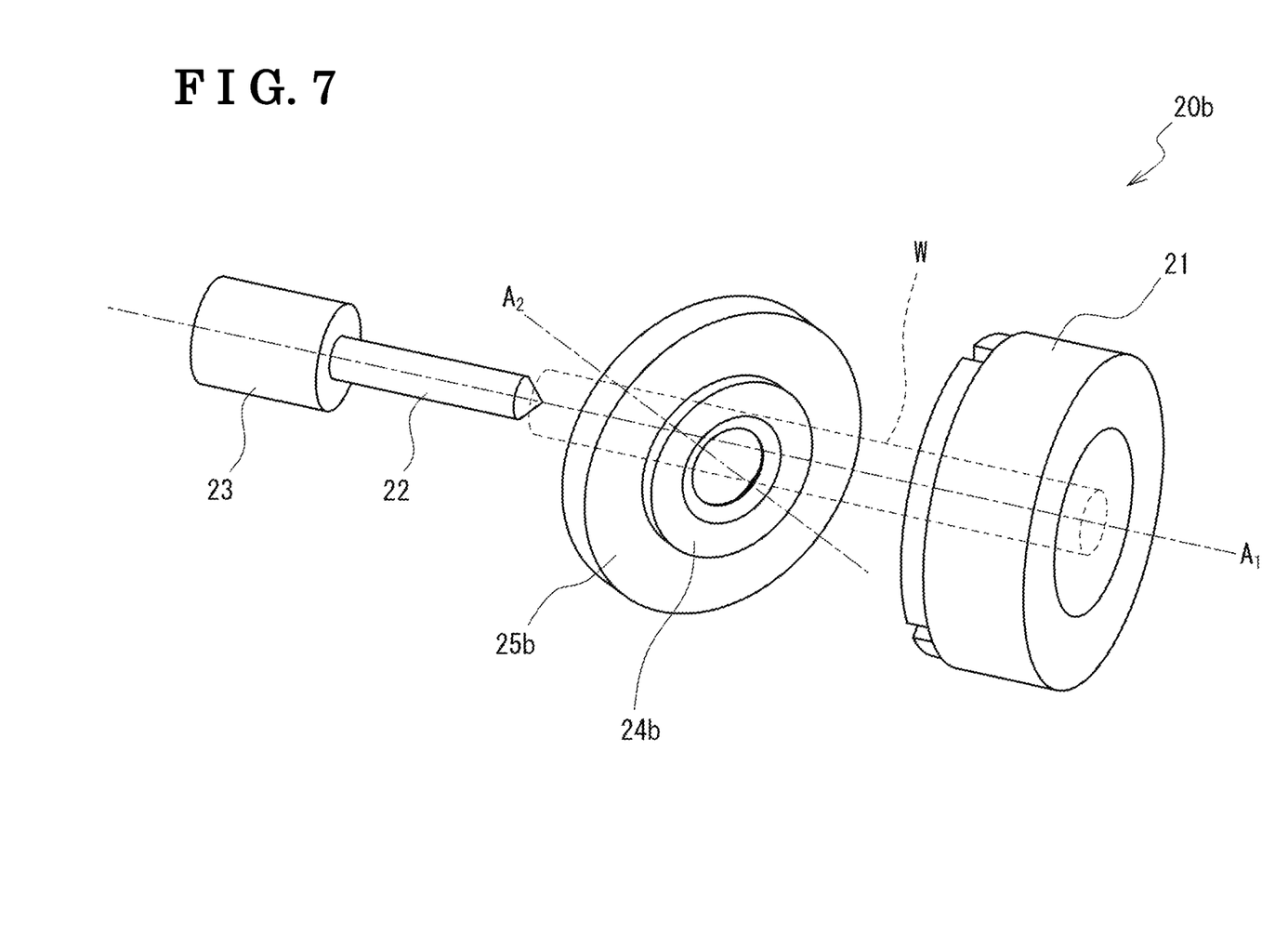
FIG. 7 is a perspective view illustrating a configuration example of a gear manufacturing device.

Next, description is made on a second device 20b that is a modified example of the device capable of implementing the gear manufacturing method according to the embodiment of this disclosure. The second device 20b is a device to which an annular tool is applied. FIG. 7 is a schematic diagram illustrating a configuration of the second device 20b. The same reference signs as those in the first device 20a are attached to constituents common to those in the first device 20a, thus denoting the common constituents, and description thereof is omitted.

As illustrated in FIG. 7, the second device 20b is configured in such a way as to be capable of manufacturing the gear 10 by using the annular tool. An annular grindstone 24b is applied to the annular tool. The annular grindstone 24b is configured in such a way that the workpiece W can be inserted through an inner peripheral side of the grindstone 24b, and is configured in such a way as to be capable of grinding an outer periphery of the workpiece W, on the inner peripheral side of the grindstone 24b. A tool holder 25b is configured in such a way that the annular grindstone 24b can be attached to the tool holder 25b while an axis (center line) of the grindstone 24b coincides with the second axis $A_2$. A shape of a section of the annular grindstone 24b cut by a plane including the second axis $A_2$ may be the same as the shape of the section of the cutting blade 24a applied to the first device 20a. Operation of the second device 20b is also the same as that of the first device 20a. According to the manufacturing method using the second device 20b, advantageous effects similar to those in the manufacturing method using the first device 20a can be achieved.

Figure 8:
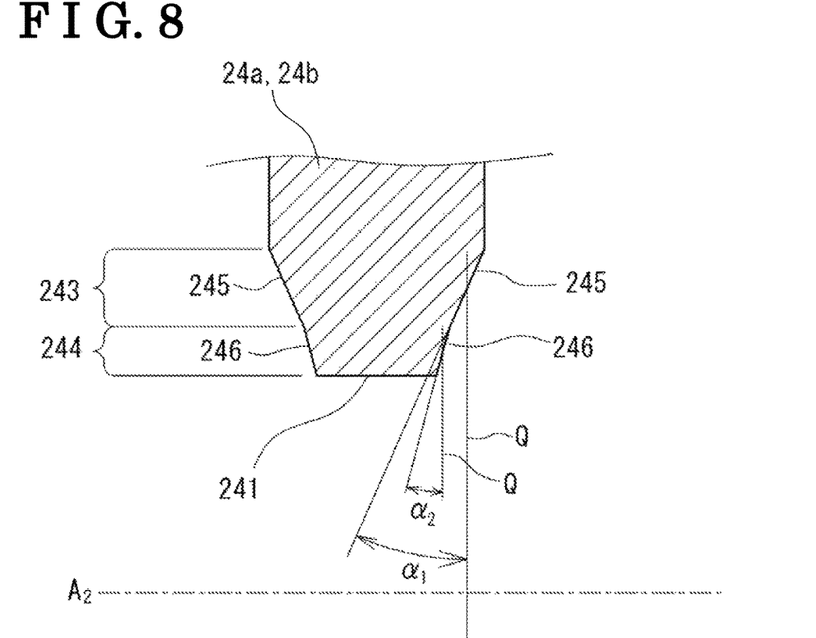
FIG. 8 is a sectional view illustrating a shape of a cutting blade according to a first modified example.
Figure 9:
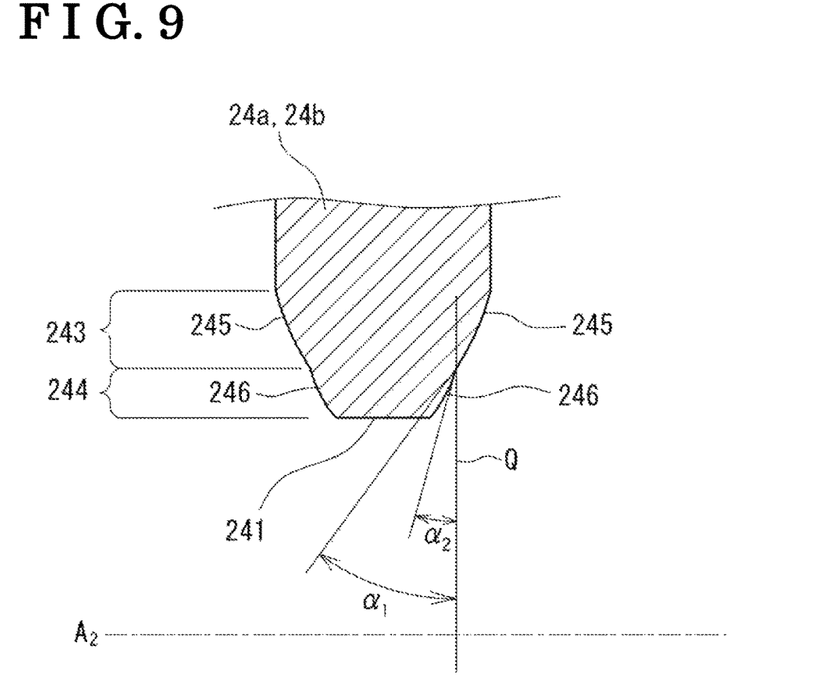
FIG. 9 is a sectional view illustrating a shape of a cutting blade according to a second modified example.

Next, description is made on modified examples of a shape of the cutting blade 24a and the annular grindstone 24b. FIG. 8 is a diagram illustrating a shape of the cutting blade 24a and the annular grindstone 24b according to the first modified example, and FIG. 9 is a diagram illustrating a shape of the cutting blade 24a and the annular grindstone 24b according to the second modified example. FIG. 8 and FIG. 9 are each an illustration of a section of the cutting blade 24a and the annular grindstone 24b cut by a plane including the second axis $A_2$. When the gear has a small diameter and a small number of teeth, and has a tooth profile that is a standard shape (e.g., when the gear is an involute gear), there is a case where when the gear meshes with a different gear, a part of a tooth near an addendum in this different gear interferes with a part of a tooth near a dedendum in the gear. For this reason, in order to prevent such interference from occurring, in some cases, a distance between tooth flanks near the dedendum in the gear having a small diameter and a small number of teeth is made larger than that in a distance between tooth flanks in a case of a standard tooth profile. The shape according to the first modified example illustrated in FIG. 8 and the shape according to the second modified example illustrated in FIG. 9 are each a shape that enables a distance between tooth flanks near the dedendum to be made larger than that in a distance between tooth flanks in a case of the standard tooth profile.

As illustrated in FIG. 8, the cutting blade 24a and the annular grindstone 24b according to the first modified example each include a first portion 243 and a second portion 244 that is located on a tip side (a side closer to the second axis $A_2$ than the first portion 243 in a state of being attached to the tool holder) of the first portion 243. Each of the first portion 243 and the second portion 244 has a tapered shape whose width decreases as a position approaches the second axis $A_2$. An outline of a section, cut by a plane including the second axis $A_2$, of a side surface 245 in the first portion 243 is a straight line, and a tool pressure angle $\alpha_1$ of the first portion 243 is constant. Similarly, an outline of a section, cut by a plane including the second axis $A_2$, of a side surface 246 in the second portion 244 is a straight line, and a tool pressure angle $\alpha_2$ of the second portion 244 is constant. However, the tool pressure angle $\alpha_2$ (absolute value) of the second portion 244 is smaller than the tool pressure angle $\alpha_1$ (absolute value) of the first portion 243. With such a configuration, a width of the tip surface 241 is larger than that in a configuration without the second portion 244. Thus, a distance between tooth flanks near the dedendum can be made larger than that in a configuration using either of the cutting blade 24a and the annular grindstone 24b without the second portion 244.

As illustrated in FIG. 9, each of the cutting blade 24a and the annular grindstone 24b according to the second modified example also includes a first portion 243 and a second portion 244 that is located on a tip side of the first portion 243. The first portion 243 has a tapered shape whose width decreases as a position approaches the second axis A. A side surface 245 of the first portion 243 is a surface curved in such a way that a tool pressure angle $\alpha_1$ increases smoothly (continuously) as a position approaches the second axis $A_2$. Similarly, the second portion 244 also has a tapered shape whose width decreases as a position approaches the second axis $A_2$. A side surface 246 of the second portion 244 is also a surface curved in such a way that a tool pressure angle $\alpha_2$ increases smoothly (continuously) as a position approaches the second axis $A_2$. However, the tool pressure angle $\alpha_2$ in the second portion 244 at a position furthest from the second axis is smaller than the tool pressure angle $\alpha_1$ in the first portion 243 at a position closest to the second axis. With such a configuration, advantageous effects similar to those in the first modified example can be achieved.

One of the tool pressure angle $\alpha_1$ of the first portion 243 and the tool pressure angle $\alpha_2$ of the second portion 244 may be constant, and the other of the tool pressure angle $\alpha_1$ of the first portion 243 and the tool pressure angle $\alpha_2$ of the second portion 244 may smoothly (continuously) increase as a position approaches the second axis $A_2$. Depending on a tooth profile of the gear 11 to be manufactured, determination is appropriately made on whether or not each of the tool pressure angle $\alpha_1$ of the first portion 243 and the tool pressure angle $\alpha_2$ of the second portion 244 is constant, and is appropriately made on specific values of the tool pressure angles $\alpha_1$ and $\alpha_2$.

Although the embodiment and the modified examples of this disclosure are described above, the technical scope of this disclosure is not limited to the above-described embodiment and modified examples. This disclosure can be modified without departing from the essence thereof, and such modifications are also included in the technical scope of this disclosure.

For example, although the above description of the embodiment cites the example in which the helical gear having the two teeth and a helix angle of 45 degrees, the number of teeth and a helix angle of the gear 10 to be manufactured are not limited to those in the above-described embodiment. A shape of the tooth 11 of the gear 10 to be manufactured is also not limited.

A gear manufacturing method according to this disclosure includes rotating a workpiece around a first axis. The method further includes rotating a tool around a second axis that is at a position skew to the first axis. The tool is an annular tool whose center is the second axis, or a tool including a plurality of cutting blades arranged annularly around the second axis. The method further includes, while causing the workpiece and the tool to perform relative movement to each other in a direction parallel to the first axis at a speed synchronized with a rotational speed of the workpiece, making an inner peripheral side of the tool contact with an outer peripheral surface of the workpiece, and removing a material of the workpiece at a contacted portion by the relative movement between the tool and the workpiece, thereby forming a helical tooth in the outer peripheral surface of the workpiece. The method further includes rotating the workpiece around the first axis, and causing the workpiece and the tool to perform the relative movement in the direction parallel to the first axis at the speed synchronized with the rotational speed of the workpiece in such a way that, in a cross section perpendicular to the first axis, an outline of the tool contacts with a target outline being an outline of the helical tooth to be formed, and meanwhile, at a predetermined one point on the target outline, makes rolling contact with the target outline without sliding relative to the target outline, and in an area other than the predetermined one point, rotates relative to the target outline while sliding relative to the target outline. In the cross section perpendicular to the first axis, a diameter of a first circle being a circle having the first axis as the center and passing through the predetermined one point is larger than a diameter of a second circle being a circle having the first axis as the center and passing through a tooth depth center in the target outline. A setting is made in such a way that, when the second axis is projected onto a plane including the first axis and being parallel to the second axis, the first axis and the projected second axis are axes different from each other.

According to this disclosure, the gear can be manufactured by one-time pass (meaning one-time relative movement between the workpiece and the tool in the direction parallel to the first axis). Thus, time required for manufacturing the gear can be shortened.

An angle $\theta$ made by the first axis and the projected second axis may be determined depending on the number N of the helical teeth to be formed in the workpiece, an interval P, in a direction parallel to the first axis, of the helical teeth to be formed in the workpiece, and a circumferential length $L_1$ of the first circle.

In this case, the angle $\theta$ made by the first axis and the projected second axis may be expressed by the following equation (1):

$$\theta = \tan^{-1}((N \times P)/L_1) \qquad \text{Equation (1),}$$

where N denotes the number of the helical teeth to be formed in the workpiece, P denotes the interval, in the direction parallel to the first axis, of the helical teeth to be formed in the workpiece, and $L_1$ denotes the circumferential length of the first circle.

In such a configuration, the angle $\theta$ made by the first axis and the projected second axis is determined based on a diameter of the first circle of the gear to be manufactured. Since a diameter of the first circle is larger than a diameter of the second circle, the angle $\theta$ can be made smaller than that in a case where a diameter of the first circle is equal to or smaller than a diameter of the second circle. Decreasing the angle $\theta$ can reduce interference between a support portion supporting the workpiece and the tool or a support portion supporting the tool, when the workpiece and the tool are moved relative to each other in a direction of the rotational center line of the workpiece. Accordingly, a length of a part where a tooth groove cannot be formed in the workpiece can be shortened. Further, decreasing the angle $\theta$ can shorten a part (a part that does not have a target shape, i.e., a designed shape) where a shape of the helical groove of the gear to be formed (i.e., a shape of the tooth groove of the gear) is incomplete.

In a section cut by a plane including the second axis, the tool may have a tapered shape whose dimension in a direction parallel to the second axis gradually decreases as a position approaches the second axis. In the section cut by the plane including the second axis, a tool pressure angle being an inclination angle of each of both end surfaces of the tool in the direction parallel to the second axis from a straight line perpendicular to the second axis may be larger than a tool pressure angle when the diameter of the first circle is made equal to the diameter of the second circle.

According to such a configuration, the angle $\theta$ made by the first axis and the projected second axis can be made smaller than an angle determined based on the diameter of the second circle of the gear to be manufactured. Thus, the gear can be manufactured while an increase in the angle $\theta$ is suppressed. According to such a configuration, merely increasing the tool pressure angle can decrease the angle $\theta$.

The tool may include a first portion and a second portion. The first portion may have a predetermined tool pressure angle. The second portion may be located on a side closer to the second axis than the first portion, and may have a tool pressure angle smaller than the predetermined tool pressure angle.

The tool may include a first portion and a second portion. The first portion may have a tool pressure angle that gradually increases as a position approaches the second axis. The second portion may be located on a side closer to the second axis than the first portion, and may have a tool pressure angle that gradually increases as a position approaches the second axis. The tool pressure angle at an end portion in the second portion on a side farther from the second axis may be smaller than the tool pressure angle at an end portion in the first portion on a side closer to the second axis.

According to such configurations, a distance between tooth flanks of the teeth near a dedendum in the gear can be made larger than that in a case of using a tool without the second portion. Accordingly, the angle $\theta$ can be made smaller.

The method may further include rotating the tool at a speed asynchronous with a rotational speed of the workpiece around the first axis and with a speed of the relative movement between the workpiece and the tool in the direction of the first axis.

According to such a configuration, the rotational speed of the tool can be increased without being restricted by the speed of the relative movement, and thus, a cutting speed can be increased. Accordingly, it is possible to manufacture a gear whose machined surface has a smaller degree of roughness. Increasing the cutting speed can increase a machining amount per unit time, and thus, time for manufacturing the gear can be shortened.

The method may further include forming the helical tooth in the outer peripheral surface of the workpiece by whirling machining of cutting the outer peripheral surface of the workpiece by the tool including a plurality of the cutting blades arranged annularly around the second axis.

According to such a configuration, the gear manufacturing method according to this disclosure can be implemented by a device capable of performing conventionally known whirling machining (thread whirling). Thus, an increase in equipment cost can be prevented.

The gear to be manufactured may be a helical gear.

Since a lead angle (=90°−(helix angle (°))) of the helical gear is larger than a lead angle of a screw for fastening, the angle θ needs to be larger than that in a case of manufacturing a screw for fastening. Thus, according to such a configuration, the angle θ can be made smaller in a case of manufacturing the helical gear.

The number of teeth of the gear to be manufactured may be any of 1 to 6.

As the number of the teeth is made smaller, a ratio of a dimension from the tooth depth center to an addendum to a diameter of a base circle of the gear becomes larger. As this ratio is made larger, a ratio of a decrease in the angle θ to an increase in the diameter of the first circle (i.e., to an increase in a dimension difference between the diameter of the first circle and the diameter of the second circle) becomes larger. For this reason, according to such a configuration, the angle θ can be made smaller.

A helix angle of the gear to be manufactured may be equal to or larger than 30 degrees and equal to or smaller than 60 degrees.

As the helix angle is made smaller, the lead angle of the helical gear becomes larger. According to such a configuration, the angle θ can be made smaller in a case of manufacturing the helical gear having a larger lead angle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for manufacturing a gear, comprising: rotating a workpiece around a first axis; rotating, around a second axis at a position skew to the first axis, an annular tool whose center is the second axis, or a tool including a plurality of cutting blades arranged annularly around the second axis; and, while causing the workpiece and the tool to perform relative movement to each other in a direction parallel to the first axis at a speed synchronized with a rotational speed of the workpiece, making an inner peripheral side of the tool contact with an outer peripheral surface of the workpiece, and removing a material of the workpiece at a contacted portion by the relative movement between the tool and the workpiece, thereby forming a helical tooth in the outer peripheral surface of the workpiece, the method further comprising: rotating the workpiece around the first axis, and causing the workpiece and the tool to perform the relative movement in a direction parallel to the first axis at a speed synchronized with a rotational speed of the workpiece, in such a way that, in a cross section perpendicular to the first axis, an outline of the tool contacts with a target outline being an outline of the helical tooth to be formed, and meanwhile, at a predetermined one point on the target outline, makes rolling contact with the target outline without sliding relative to the target outline, and, in an area other than the predetermined one point, rotates relative to the target outline while sliding relative to the target outline, wherein, in the cross section perpendicular to the first axis, a diameter of a first circle being a circle having the first axis as a center and passing through the predetermined one point is larger than a diameter of a second circle being a circle having the first axis as a center and passing through a tooth depth center in the target outline, and a setting is made in such a way that, when the second axis is projected onto a plane including the first axis and being parallel to the second axis, the first axis and the projected second axis are axes different from each other.

2. The method for manufacturing the gear according to claim 1, wherein an angle θ made by the first axis and the projected second axis is determined depending on the number N of the helical teeth to be formed in the workpiece, an interval P, in a direction parallel to the first axis, of the helical teeth to be formed in the workpiece, and a circumferential length $L_1$ of the first circle.

3. The method for manufacturing the gear according to claim 2, wherein the angle θ made by the first axis and the projected second axis is expressed by the following equation (1):

$$\theta = \tan^{-1}((N \times P)/L_1) \qquad \text{Equation (1)},$$

where N is: the number of the helical teeth to be formed in the workpiece,

P is: an interval, in a direction parallel to the first axis, of the helical teeth to be formed in the workpiece, and $L_1$ is: a circumferential length of the first circle.

4. The method for manufacturing the gear according to claim 1, wherein, in a section cut by a plane including the second axis, the tool has a tapered shape whose dimension in a direction parallel to the second axis gradually decreases as a position approaches the second axis, and, in the section cut by the plane including the second axis, a tool pressure angle being an inclination angle of each of both end surfaces of the tool in a direction parallel to the second axis from a straight line perpendicular to the second axis is larger than a tool pressure angle when a diameter of the first circle is made equal to a diameter of the second circle.

5. The method for manufacturing the gear according to claim 4, wherein
the tool includes:
a first portion having a predetermined tool pressure angle; and
a second portion being located on a side closer to the second axis than the first portion and having a tool pressure angle smaller than the predetermined tool pressure angle.

6. The method for manufacturing the gear according to claim 4, wherein
the tool includes:
a first portion having a tool pressure angle that gradually increases as a position approaches the second axis; and
a second portion being located on a side closer to the second axis than the first portion and having a tool pressure angle that gradually increases as a position approaches the second axis, and
the tool pressure angle at an end portion in the second portion on a side farther from the second axis is smaller than the tool pressure angle at an end portion in the first portion on a side closer to the second axis.

7. The method for manufacturing the gear according to claim 1, wherein
the method further comprises: rotating the tool at a speed asynchronous with a rotational speed of the workpiece around the first axis and with a speed of the relative movement between the workpiece and the tool in the direction of the first axis.

8. The method for manufacturing the gear according to claim 1, wherein
a gear to be manufactured is a helical gear.

9. The method for manufacturing the gear according to claim 8, wherein
the number of teeth of the gear to be manufactured is any of 1 to 6.

10. The method for manufacturing the gear according to claim 8, wherein
a helix angle of the gear to be manufactured is equal to or larger than 30 degrees and equal to or smaller than 60 degrees.

* * * * *